Aug. 29, 1950     L. W. VINAL     2,520,263
METHOD OF SEPARATING SPRUES FROM MOLDED ARTICLES
Filed Dec. 7, 1946     5 Sheets-Sheet 1

INVENTOR.
Leroy W. Vinal
BY Charles R. Fay,
Attorney

Aug. 29, 1950         L. W. VINAL         2,520,263
METHOD OF SEPARATING SPRUES FROM MOLDED ARTICLES
Filed Dec. 7, 1946         5 Sheets-Sheet 2

INVENTOR.
Leroy W. Vinal
BY Charles R. Fay,
ATTORNEY

INVENTOR.
Leroy W. Vinal
BY Charles R. Fay,

A. Horner

Patented Aug. 29, 1950

2,520,263

UNITED STATES PATENT OFFICE 2,520,263

METHOD OF SEPARATING SPRUES FROM MOLDED ARTICLES

Leroy W. Vinal, Leominster, Mass., assignor to E. I. du Pont de Nemours & Company, Wilmington, Del., a corporation of Delaware Application December 7, 1946, Serial No. 714,680

7 Claims. (Cl. 18—47.5)

The invention relates to a method for accomplishing the separation of the sprues from molded articles while still in the dies or molds.

Objects of the invention include the provision of a method for automatically removing sprues from articles being molded so that upon mere opening of the dies for the ejection of the articles, the sprues will all be separated; and the provision of a method for making brushes wherein the sprue enters the area of the brush which is later to be bristled and including the step of automatically separating these sprues so that no finishing operations whatsoever are necessary and the brush blanks may be taken directly from the molds to be bristled, completely avoiding all cutting or polishing of the sprue marks.

Further objects of the invention include the provision of a method of utilizing a mold or die embodying movable nozzles for the sprues, said nozzles being movable within and relative to the die and being constructed and arranged so that upon moving the nozzles relative to the die the sprues will be separated from the articles being molded; and more specifically the nozzles are each provided with an eccentric passage for the molding material to form the sprue so that upon rotation of the nozzles the sprue is swept across and angularly with respect to the article which has been molded so as to forcibly separate the sprue from the article; and the provision of a sprue nozzle as aforesaid embodying a wedge-shaped orifice so that the portion of the sprue next adjacent to the article being molded is in the form of a wedge which may be easily separated from the article by a twisting motion.

Other objects and advantages of the invention will appear hereinafter.

Reference is to be had to the accompanying drawings in which

Figure 1:
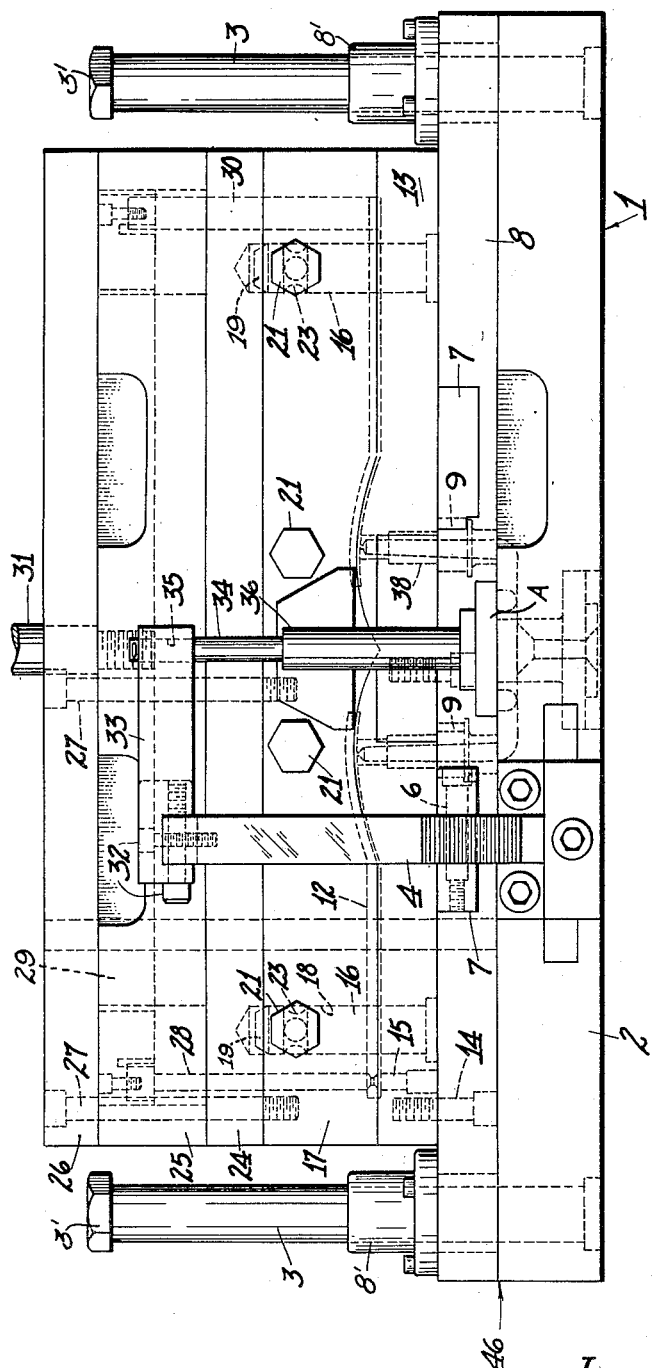
Fig. 1 is a view in front elevation of the die or mold.
Figure 3:
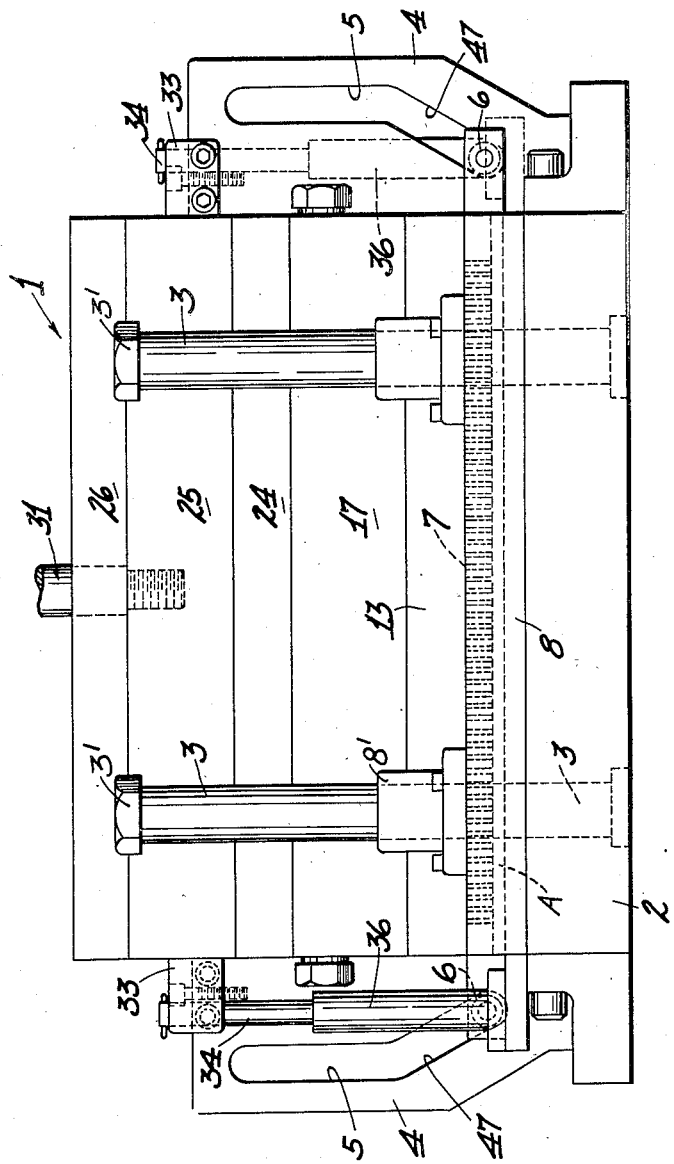
Fig. 3 is an end view in elevation of the die or mold.

The die is generally indicated at 1 and comprises a base plate 2 on which are fixedly secured a plurality of vertical guide rods 3 which extend upwardly from plate 2 as clearly shown in Fig. 1 and terminate in stops 3'. Also fixed to the base plate 2 there are provided a pair of upright cam brackets 4 which are clearly shown in Fig. 3. Each cam bracket is provided with a cam slot 5 in which is located a cam follower 6, it being noted that the cam brackets 4 extend upwardly from the base plate 2.

Each cam follower 6 is secured to the end of a rack 7, these racks being parallel and extending transversely across the die and being slidably guided in a horizontal plate 8, the latter being in turn slidably mounted for vertical movement on the guide rods 3 by means of guide bushings 8', so that it will be seen that the motions of the racks must be longitudinal thereof and transverse to the die and to the motion of the plate 8 on guide rods 3.

Each of the racks is arranged in operative engagement with a series of gears 9 so that as the racks are longitudinally moved all of the gears must rotate to a degree fixed by the degree of motion of the racks.

The articles being molded are indicated at 12 and a part of each die cavity is formed in a plate 13 which is bolted to plate 8 as by bolts 14. Plate 13 is provided with a bushing or stud 15 which forms one-half of the hanger hole in the event that the articles 12 are to be toothbrushes. It is to be noted that this case is illustrated as applied to toothbrush handles but, of course, it is contemplated that the invention is not restricted to these articles, the toothbrush handles being shown by way of illustration and also because the present invention embodies features which are particularly adapted to toothbrushes and to other brushes which contain bristles.

Figure 2:
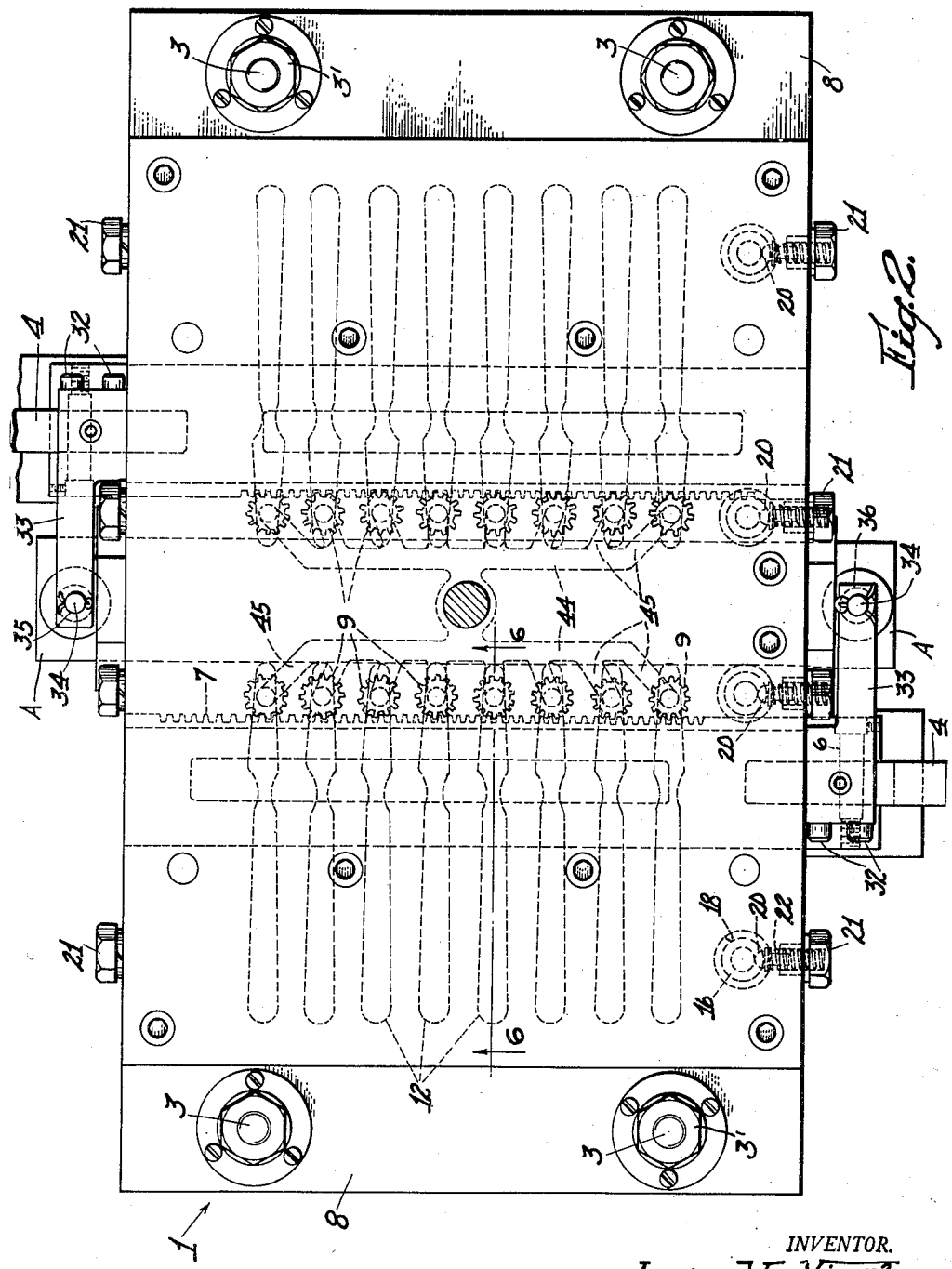
Fig. 2 is a top plan view thereof.

Mounted in plate 13 there are a series of studs 16. Studs 16 rise from plate 13 and are slidably engageable with a plate 17 in which is formed the remainders of the die cavities. Plate 17 is provided with bores 18 to receive studs 16 and the latter are provided with conical tops 19 so that when the die is closed the conical formation will cam back a plunger 20, see Fig. 2, into a hollow stud 21 against the action of a spring 22. The studs 16 are provided with grooves 23 just below the conical heads 19 so that the spring pressed plunger 20 will snap into the grooves and thus act as spring biased locks to secure plates 17 and 13 together except as the spring pressed plungers may be forced back as will be later described.

There are provided a pair of intermediate plates 24 and 25 secured to die plate 17 and the back plate 26 by means of studs or bolts 27. Plate 25 is hollow and contains a thinner floating knock out plate 29, shown in dotted lines in Fig. 1 in raised position relative to plates 24 and 25. Knock out plate 29 has secured thereto knockout pins 28 and push back pins 30, only one of each pin being shown for clarity of illustration. A rod 31 is secured to plate 29 through an aperture in plate 26 and serves to move plate 29 in a direction to cause the ends of pins 28 to eject the molded articles when the die is open, and as the die again closes, pins 30 strike plate 13 and push the plate 29 back to the normal position shown in Fig. 1. During the molding operation, the ends of pins 28 cooperate with studs 15 to complete the hanger hole in a toothbrush handle.

Mounted on each cam bracket 4 by means of bolts 32 there is provided a stop plate 33, it being obvious that these stop plates are fixed with relation to base plate 2. Each stop plate 33 has slidably mounted therein a shaft 34 running in a bore 35 and the shafts 34 are provided with enlarged portions 36 which are incapable of passing through or entering bores 35. Shafts 34 are fixed to a sprue ejector plate A.

Figure 6:
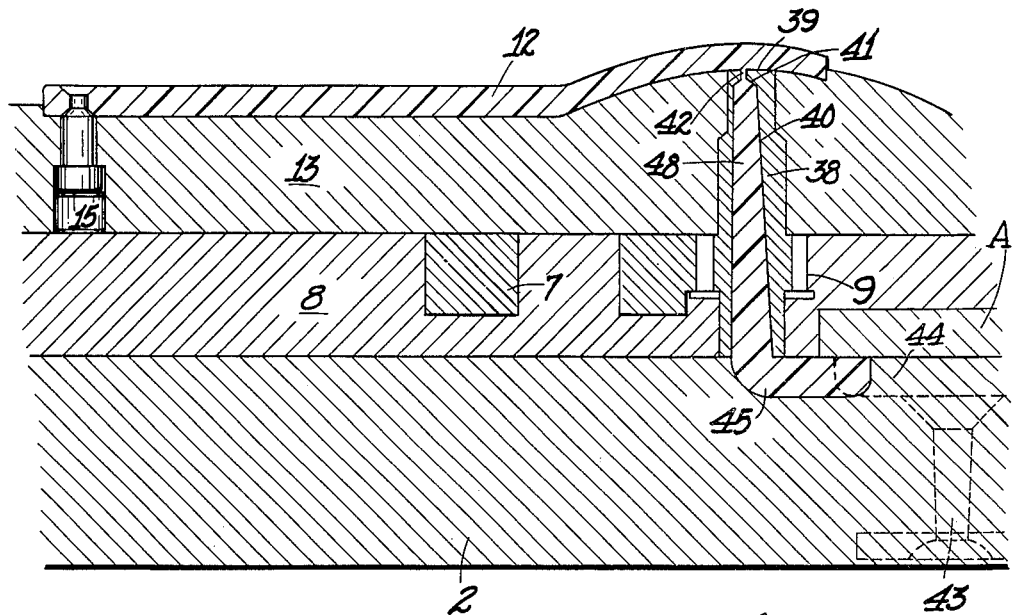
Fig. 6 is an enlarged section taken along line 6—6 of Fig. 2.
Figure 5:
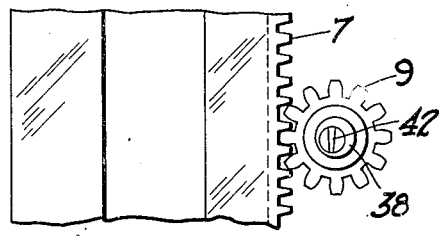
Fig. 5 is a fragmentary plan view of the rack and gear arrangement and showing the sprue nozzle.

Referring now to Figs. 5 and 6, wherein is shown one of the gears 9, it will be seen that this gear is fixed to or made integral with a nozzle or bushing 38, this bushing extending to the die cavity surface in the plate 13 and the end thereof as at 39 actually forms a small part of the molding cavity. It will be clear that the bushing or nozzle 38 will rotate with gear 9 upon the actuation of rack 7. The nozzle 38 is provided with an inclined interior bore 40 which gradually converges upwardly as clearly shown in Fig. 6. This bore is a passage for the molding material and terminates in shoulders 41 which are spaced to form a small wedge-shaped opening 42 leading directly into the molded article 12. The apparatus is so designed that the narrow end of the wedge at 42 provides an easily separable sprue due to the fact that upon rotation of nozzle 38 the narrow end of the wedge-shaped sprue will start to separate first so that the complete separation thereof is facilitated. The lower end of bore 40 in bushing or nozzle 38 is concentric with nozzle bearing so that rotation of the nozzle does not separate the sprue from the runner 45 but results in a gradual twist of the entire sprue, which twist tends to loosen the sprue in the nozzle for easy ejection after the separation at 42.

The molding material enters the plate 2 as at 43 and continues in a longitudinal passage 44 which branches out at 45 to the various nozzles 38.

The die illustrated in the present drawings is a sixteen place die, there being eight articles at each side and the molding material therein will not only be injected as just described but will also fill the remaining eight cavities at the other side of the die.

Figure 4:
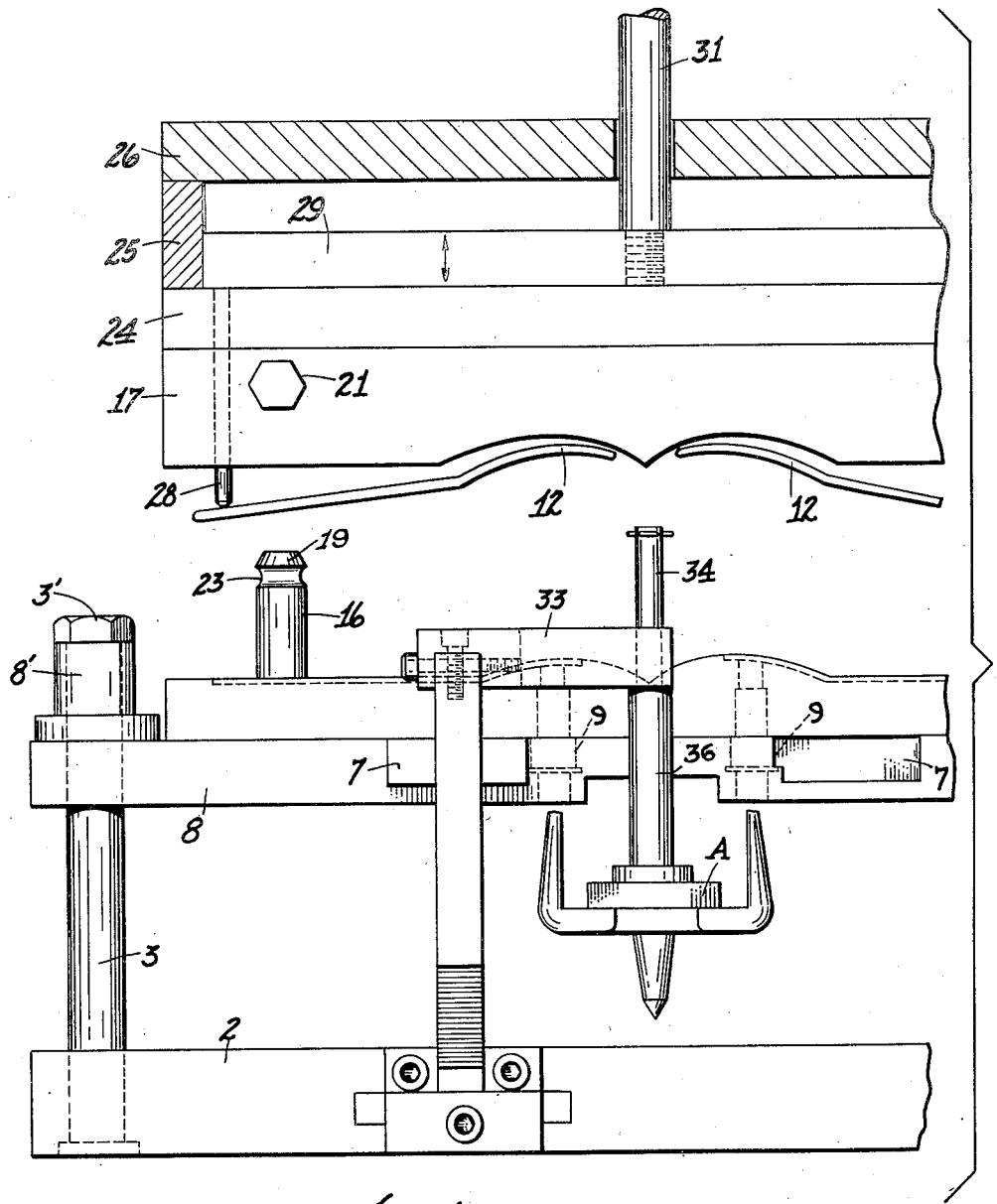
Fig. 4 is a view in side elevation with parts broken away and illustrating the opening motion of the die.

In the operation of the die, the same is, of course, closed for the injection and when the injection is complete, the die starts to open by mechanism which may be conventional and forms no part of the invention. The spring biased plungers 20 locking in studs 21 prevent the separation of die plates 17 and 13 by insuring that the same will move together for a short space as clearly illustrated in Fig. 4. This means that the dies are separated along a line 46, see Fig. 1, and during this motion the cam followers 6 are forced along the inclined cam slot portions 47 to move the racks outwardly and thereby cause the rotation of the gears 9 and consequently rotation of nozzles 38. Due to the eccentricity of the bores 40 in nozzles 38 the sprues 48 will be given a motion transverse of and relative to the articles being molded 12 so that the wedge-shaped portions of the sprues 42 will be caused to separate from the articles and this separation will be a relatively cleancut separation due to the fact that the wedge-shaped portion 42 of the sprue is, of course, closely held in the tip of the nozzle 38. As soon as sufficient separation of die plates 2 and 8 has been made to accomplish the sprue separation as above described, the enlarged portion 36 of shaft 34 impinges on stop plate 33.

The engagement of enlarged portion 36 with stop plate 33 stops any further movement of plate A, Fig. 1. As the still closed die continues to slide along guide rods 3 the sprues 48 and runners 45 are withdrawn from bushings 38 and when completely withdrawn will drop out. When guide bushings 8' reach shoulders 3' on guide rods 3 the resilient force of the spring pressed plungers 20 is overcome and die plate 17 is separated from die plate 13. Near the end of the die opening stroke of the machine the rod 31 strikes the knockout plate of the press which forces down the knock out plate 29 and with it the pins 28 ejecting the handles 12 from die plate 17.

It will be seen that this invention provides a comparatively simple and extremely efficient means of separating the sprues from the molded articles so that the latter may be ejected free of the sprues and ready for the next operation without cutting the sprues and consequent necessary finishing or polishing, and also provides a simple means of ejecting the sprues and runners.

As shown in the disclosure of this case the sprues enter the toothbrush handles 12 in the "spoon" area thereof, these areas being those which are later to be bristled to complete the toothbrushes. Due to the fact that this area is bristled, the irregularities or roughness occasioned by the separation of the sprues will not be apparent in the finished article and for this reason, this invention is particularly adapted to brushes and toothbrushes but, of course, may be applied to any molded article.

Having thus described my invention and the advantages thereof, I do not wish to be limited to the details herein disclosed otherwise than is set forth in the claims, but what I claim is:

1. Method of separating a sprue from a molded article prior to ejection from the mold comprising twisting the sprue in the mold about an axis passing lengthwise through the sprue while maintaining the article itself in fixed position relative to the mold.

2. Method of separating a sprue from a molded article comprising rotating the sprue in the mold and about an axis passing lengthwise through the sprue but eccentric to the sprue axis.

3. Method of separating an elongated sprue having a narrow reduced tip from a molded article while retained in a mold comprising twisting the sprue tip adjacent the article about an axis passing lengthwise through the tip while maintaining the article itself fixed with reference to the mold.

4. Method of separating an elongated sprue having a narrow reduced tip from a molded article comprising rotating the sprue tip adjacent the article about an axis passing lengthwise through the sprue but eccentric to the sprue axis.

5. Method of separating an elongated sprue having a narrow reduced tip from a molded article comprising causing the article end of the sprue to move in a curved path substantially concentric with an axis passing lengthwise through the sprue but eccentric to the general axis of the sprue.

6. Method of removing sprues from molded articles while retained in a mold comprising the steps of forming the sprues each with a reduced tip at the surface of the article, rotating the sprues bodily about an axis passing lengthwise through the sprue while retaining the article in fixed position relative to the mold.

7. The method of claim 6 wherein the axis of rotation is eccentric to the centers of the tips.

LEROY W. VINAL.

REFERENCES CITED

The following references are of record in the file of this patent:

UNITED STATES PATENTS

| Number | Name | Date |
|---|---|---|
| 1,174,049 | Brand et al. | Mar. 7, 1916 |
| 2,273,717 | Millard et al. | Feb. 17, 1942 |
| 2,290,129 | Moreland et al. | July 14, 1942 |
| 2,298,716 | Moreland et al. | Oct. 13, 1942 |
| 2,329,346 | Goff | Sept. 14, 1943 |
| 2,330,369 | Marsh | Sept. 28, 1943 |
| 2,331,702 | Kopitke | Oct. 12, 1943 |
| 2,358,857 | Gits | Sept. 26, 1944 |
| 2,386,697 | Lynch | Oct. 9, 1945 |
| 2,404,671 | Vinal | July 23, 1946 |
| 2,408,629 | Green | Oct. 1, 1946 |